United States Patent [19]

Lermann et al.

[11] 4,251,142
[45] Feb. 17, 1981

[54] LIGHT TOTALIZING SYSTEM FOR PHOTOGRAPHIC CAMERA PROVIDED WITH A SHUTTER-DIAPHRAGM

[75] Inventors: Peter Lermann, Narring; Eduard Wagensonner, Aschheim; Wolfgang Ruf, Munich, all of Fed. Rep. of Germany

[73] Assignee: AGFA-Gevaert, A.G., Leverkusen, Fed. Rep. of Germany

[21] Appl. No.: 37,456

[22] Filed: May 9, 1979

[30] Foreign Application Priority Data

May 12, 1978 [DE] Fed. Rep. of Germany ....... 2820989

[51] Int. Cl.³ .............................................. G03B 7/097
[52] U.S. Cl. ................................... 354/23 D; 354/29; 354/60 A
[58] Field of Search ...................... 354/230, 36, 38, 29, 354/30, 43, 44, 50, 51, 60 A; 328/48

[56] References Cited

U.S. PATENT DOCUMENTS

| | | | |
|---|---|---|---|
| 3,202,837 | 8/1965 | Baracket | 328/48 X |
| 3,548,203 | 12/1970 | Basse et al. | 328/48 X |
| 3,992,098 | 11/1976 | Wirtz | 354/23 D X |
| 3,997,905 | 12/1976 | Iwata | 354/29 |

Primary Examiner—L. T. Hix
Assistant Examiner—William B. Perkey
Attorney, Agent, or Firm—Michael J. Striker

[57] ABSTRACT

During the ongoing course of the exposure, the aperture area increases linearly to a maximum value and then stays at the maximum value, the instantaneous amount of exposure light therefore changing correspondingly, even if the ambient-light level remains constant during the exposure. A pulse generator includes a photodetector exposed to ambient light and generates a pulse train of light-dependent repetition frequency, the pulses of which are counted by a light-totalizing counter which eventually generates a terminate-exposure signal. Ideally, the repetition frequency should increase steplessly and linearly, for maximum accuracy, or second best increase stepwise in small steps to approximate to a stepless linear increase, but in order to use an extremely low number of stepwise frequency changes, without loss of system accuracy, no attempt is made to per se keep the light-indicating repetition frequency accurate. Instead, the number and amounts of the repetition-frequency changes are so established that, when the repetition frequency is plotted against elapsed exposure time, it is proportional to a piecewise linearization of the time integral curve of the exposure-aperture surface area, the constituent straight-line segments of the linearization being confined within a predetermined error-of-total-exposure tolerance range. In the case of a linear increase of aperture size concluding in maximum size, this corresponding to a quadratic followed by a straight-line rise of the time integral of the exposure-aperture surface area, the requisite time integral curve, despite its complexity, can, for example, be implemented using as few as only three or even as few as two stepwise changes of repetition frequency, without loss of system accuracy.

10 Claims, 3 Drawing Figures

LIGHT TOTALIZING SYSTEM FOR PHOTOGRAPHIC CAMERA PROVIDED WITH A SHUTTER-DIAPHRAGM

BACKGROUND OF THE INVENTION

The present invention concerns light totalizers for cameras provided with shutter-diaphragms. A shutter-diaphragm is a structure which defines the exposure aperture of the camera and is operative, during the course of an exposure, for progressively opening up the exposure aperture from zero or a minimum aperture size through intermediate aperture sizes up to a maximum aperture size. After the elapse of an appropriate exposure interval, the exposure aperture of the camera is abruptly blocked against incoming light, in response to a terminate-exposure signal. Typically, the terminate-exposure signal is produced by a light integrator or totalizer. The light integrator or totalizer comprises a photosensitive element exposed to ambient scene light and operative for generating a light-dependent signal, plus also integrating or totalizing circuitry operative for integrating or totalizing the light-dependent signal to yield a totalized-light signal. When the totalized-light signal reaches a predetermined value, the terminate-exposure signal is generated. If the scene-light level is very low, the exposure will in general not be terminated until after the shutter-diaphragm has assumed its maximum aperture size, with a sizable fraction of the total duration of the exposure being performed at maximum exposure-aperture size. If the scene-light level is somewhat higher, a smaller fraction of the total duration of the exposure is performed at maximum exposure-aperture size. For scene-light levels which are not low, the terminate-exposure signal is generated before maximum exposure-aperture size is even reached by the shutter-diaphragm.

For light totalizers used with such shutter-diaphragms, the scene-light signal produced, being as it is an indication of instantaneous exposure light, must take into account the progressive increase in exposure-aperture size occurring during the initial part, or indeed the entirety, of the exposure. This can be done by modifying the light-dependent signal totalized by the light totalizer in such a way that its value be dependent not only upon the ambient scene light to which the light detector of the system is exposed but additionally dependent, in one or another way, upon the progressive increase in exposure-aperture size. For example, in the case of shutter-diaphragms of the type which implement a linear increase of exposure-aperture surface area up to the point where maximum exposure-aperture size is reached, a properly designed light-totalizing system should nominally totalize a scene-light signal whose instantaneous value increases in correspondence to increasing aperture size during the opening-up of the exposure aperture, and thereafter remains at a constant value, determined by the ambient scene-light level, for the subsequent portion, if any, of the exposure during which the exposure-aperture stays at maximum size.

This can be accomplished in various ways. For example, it is known to generate the light-dependent signal to be totalized using a first photosensitive detector during the opening-up of the exposure aperture, and a second photosensitive detector subsequent to the exposure aperture reaching its maximum surface area.

However, we have considered the use of an entirely different type of light totalizer which comprises a pulse generator, including a photosensitive element exposed to ambient scene light, operative for generating a pulse train whose pulse repetition frequency varies in dependence upon the scene-light level, with the totalizer stage of the system being a digital counter operative for counting pulses from the light-dependent pulse generator and producing a terminate-exposure signal at least in dependence upon the reaching of a predetermined count. In particular, we have considered how, with a light totalizer of this type, the progressive exposure-aperture size increase which occurs with a shutter-diaphragm can be taken into account.

If, during the course of the exposure, the exposure aperture's surface area is increasing as a linear function of elapsed time, a plot of exposure-aperture surface area versus elapsed time would be an inclined line of nominally constant slope. Accordingly, from the nature of the problem presented by such shutter-diaphragms, a natural approach would be to make the value of the scene-light signal (i.e., the pulse repetition frequency of the light-dependent pulse train) likewise increase linearly during the linear increase in the size of the exposure aperture.

However, implementation of a truly stepless linear increase of pulse repetition frequency, can be rather problematic for reasons of complexity and cost.

An alternative to stepless adjustability of repetition frequency would be resort to a progressive stepwise increase of pulse-repetition frequency, i.e., by discrete successive increments. Nominally, the value of the scene-light signal to be totalized should exhibit a straight-line increase, i.e., appear as an inclined straight line when plotted on paper against elapsed time. Such an inclined straight line can, certainly, be approximated using a sufficiently great number of successive small stepwise increases, i.e., so that the difference between the staircase-like increase in the value (here, the repetition frequency) of the signal to be totalized, on the one hand, on the other hand, the inclined-straight-line increase ideally desired, not exhibit excessive percentage error, or what would appear to be excessive percentage error. However, the use of a large number of small increments in the repetition frequency to achieve such an approximation to straight-line increase can lead to considerable expense, because in most cases a discrete circuit stage would be needed for each respective one of the series of stepwise repetition-frequency increments.

SUMMARY OF THE INVENTION

It is a general object of the invention to provide a shutter-diaphragm with a light-totalizing system, of the type producing a counted pulse train of light-dependent pulse-repetition frequency, and in which furthermore the repetition frequency of the light-dependent pulse train can be increased stepwise in distinct increments, but with only a relatively small total number of such stepwise increments of repetition frequency being needed for the whole range of operation of the shutter-diaphragm.

In accordance with one, very broad feature of the invention, this is done by, so to speak, ignoring an attempt to per se minimize the percentage error in the value (the repetition frequency) of the scene-light signal, i.e., relative to the stepless straight-line increase which such value should ideally have. Instead, resort is made to piecewise linearization of the quadratic totalized-light signal, the piecewise linearization of the totalized-light signal, not of the scene-light signal to be totalized, being performed within tolerance limits, i.e., being performed with consideration paid to minimization of percentage error. When that is done, it emerges that a very low number of discrete stepwise increases in the value (the repetition frequency) of the scene-light signal to be totalized suffices to keep the actual operation of the system within a limited tolerance range centered about ideal or nominal operation.

According to a further concept of the invention, in order to still further reduce the total number of repetition-frequency increases needed, the successive repetition-frequency values are such that the piecewise linearization of the time-integral curve of exposure-aperture size is kept within an acceptable percentage-error tolerance range only for that part of the curve which is located past the minimum exposure duration which the shutter-diaphragm system can implement. It will be appreciated that every shutter-diaphragm system is capable of implementing an exposure duration not shorter than a minimum value which is characteristic for the particular shutter-diaphragm design employed. The absence of accurate totalized-light information during this first part of the exposure is entirely without importance, to the extent that termination of the exposure within this time interval might be concerned; as already stated, this is an initial part of the exposure during which exposure termination will not be physically implemented by the shutter-diaphragm system. However, the totalized-light information generated during this initial part of the exposure is very much of importance for system operativeness, because when the exposure has continued to the point where an exposure termination could be implemented by the system, it is necessary that, starting at such time, accurate totalized-light information be available to the system, so that it can in fact terminate the exposure at this time, if to do so would actually be appropriate. In order that accurate totalized-light information be available starting at such time, it is not sufficient, for example, merely to design the light-totalizing counter such that it have, at such time a constant starting count, or the like; such starting count, i.e., the value which the totalized-light information is to have at the point when exposure-termination begins to possible, is not constant, but on the contrary depends upon the prevailing scene-light level.

In consideration of the foregoing, it is a further concept of the invention to so control the initial repetition frequency of the scene-light signal that, when transformed onto the plane of the totalized-light curve, the first straight-line segment of the piecewise linearization of such curve bridge across from the vertical axis to the point of minimum realizable exposure duration, outside the range of acceptable percentage error of totalized-light information, but with such a slope that, as this line segment continues on into the range of realizable exposure duration it be, from that point on, within the range of acceptable percentage error.

The invention contemplates a further reduction in the number of stepwise repetition-frequency increases needed for operativeness, by resort to a special relationship at the other end of the totalized-light curve, i.e., at the region corresponding to the reaching of maximum attainable aperture size, past which, if the exposure continues, there is no further increase in aperture size. Past the point of maximum aperture size, the totalized-light curve of the system converts to straight-line form, it being assumed for explanation, but not for operation, that the ambient scene-light level does not change during the course of the exposure. This straight-line continuation of the totalized-light curve translates into a constant repetition frequency of the scene-light signal. In order that, to either side of this maximum-aperture point, there need not be two discrete line segments of differing slopes in the piecewise linearization—i.e., in order that the repetition frequency employed not require a change past the maximum-aperture point—, the straight-line continuation of the totalized-light curve is extended backwards to simultaneously constitute, as far down as possible within the range of progressive aperture-size increase, the terminal line segment of the piecewise linearization.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
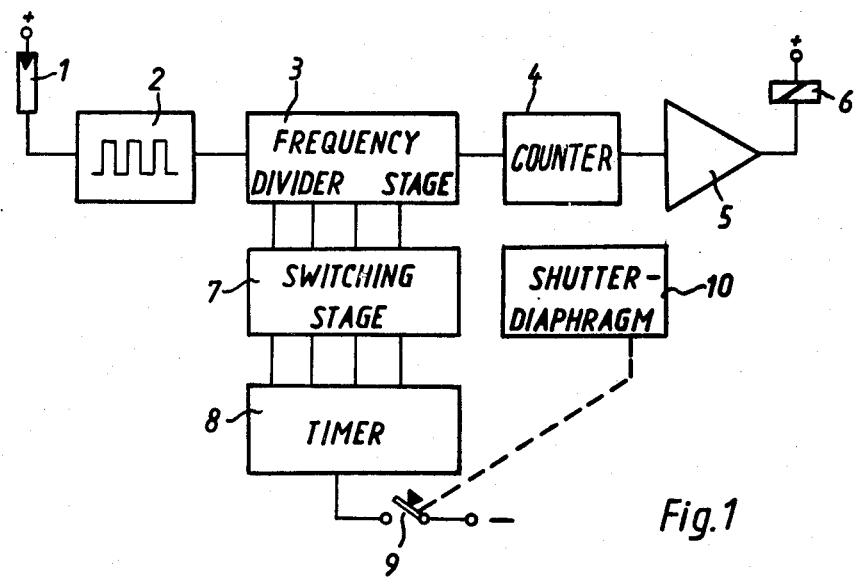
FIG. 1 is a schematic block circuit diagram of the light totalizer used in accordance with the present invention for a shutter-diaphragm system.

In FIG. 1, numeral 1 denotes a photosensitive element exposed to ambient scene light and forming part of the frequency-determining means of a light-dependent pulse generator 1, 2 operative for producing a train of pulses whose pulse repetition frequency increases with increasing scene-light level and decreases with decreasing scene-light level. Numeral 3 denotes a controllable frequency-divider stage operative for transmitting pulses from light-dependent pulse generator 1, 2 with any of a plurality of different frequency-division factors, discussed below. The output pulses from frequency-divider stage 3 are transmitted to the input of a light-totalizing counter 4 which counts these pulses. When a predetermined count is reached, indicating that the correct degree of exposure has been achieved, light-totalizing counter 4 produces an output signal, which is applied via an amplifier 5 to a shutter-closing electromagnet 6 operative for terminating the exposure. The pulse train applied to the input of light-totalizing counter 4 constitutes the light-dependent signal of the system, and the repetition frequency of the pulse train constitutes the light-dependent value of such signal.

The successive frequency-division factors which stage 3 establishes during the ongoing course of an exposure are selected by a switching stage 7. Switching stage 7, in turn, is controlled by a timer 8 whose operation is initiated upon the closing of a switch 9 coupled to the camera's shutter-diaphragm 10. During the course of an exposure, the shutter-diaphragm 10 progressively opens its exposure aperture, it being here assumed that the progressive increase in exposure-aperture surface area is a straight-line function of time until the exposure-aperture reaches its maximum size, whereupon the exposure-aperture stays at maximum size if the exposure continues beyond that point. During the opening-up of the exposure aperture, the timer 8 causes the switching stage 7 to activate the frequency-divider stage 3 for different successive frequency-division factors, each successively lower than the one before. As a result, the repetition frequency of the light-dependent pulse train applied to counter 4 is stepwise increased during the opening-up of the exposure aperture. For simplicity of explanation, it can be assumed that the actual scene-light level does not change during the course of an exposure; this assumption, although it facilitates explanation, is not a prerequisite for operativeness.

With the surface area of the exposure aperture increasing linearly with respect to time during the opening-up of the aperture, then nominally the value of the light-dependent signal (the repetition frequency of the pulse train) applied to light-totalizing counter 4 should exhibit an exactly corresponding stepless linear increase with respect to time. As has been explained further above, if this linear increase is not implemented by resort to stepless adjustability of the pulse-repetition frequency, but instead as here by resort to stepwise adjustability of the repetition frequency, an extremely fine stepwise approximation to the stepless linear increase could be achieved, by resort to a sufficiently large number of small successive increments of the repetition frequency; the frequency of the pulse train plotted with respect to time, although it would exhibit staircase character, could be made to extremely closely approximate the simple positive-slope straight line representing the linear increase of exposure-aperture surface area, and at no point during the ongoing course of the exposure would the value (the repetition frequency) of the scene-light signal depart more than minimally from the nominal value which it should ideally have.

However, the present invention adopts a different approach, and does not attempt to keep the value (the repetition frequency) of the scene-light signal in the closest possible conformity to the ideal stepless linear increase implied by the linear increase of the exposure-aperture surface area.

Figure 2:
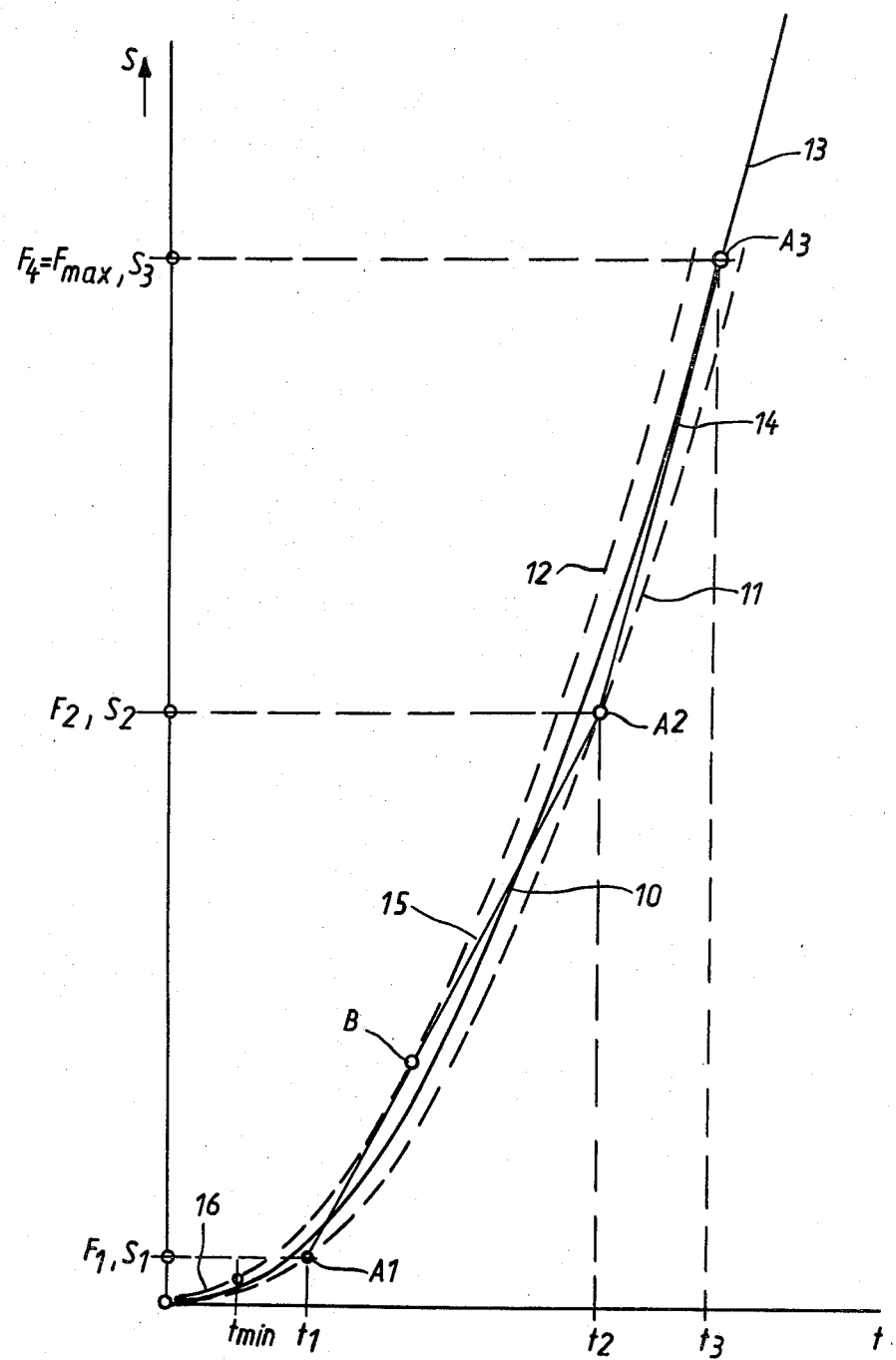
FIG. 2 depicts the totalized-light curve pertaining to performance of an exposure using a shutter-diaphragm system.

Attention is directed to FIG. 2, where the relationships actually relied upon are depicted.

In FIG. 2, curve 10 is a parabolic or quadratic curve representing the time integral, during the course of an exposure, of the exposure light incident on the camera's film through the camera's shutter-diaphragm, it being assumed that, during the opening-up of the shutter-diaphragm's exposure aperture, the surface area of the exposure aperture increases as a linear function of time, i.e., at a constant rate, starting from zero surface area. Accordingly, the value of the exposure-light time integral S increases quadratically with respect to elapsed time, until the moment t3 at which maximum exposure-aperture size is reached, after which moment the exposure-light time integral S continues to increase, but as a straight-line function.

In FIG. 2, the time instant $t_{min}$ represents the earliest moment during the course of an exposure at which whatever shutter-diaphragm design is employed could, if already appropriate to do so, terminate the exposure.

As already explained, with the light-dependent signal applied to the system's light totalizer being a pulse train, and the light-dependent value of the signal being its repetition frequency, it would appear appropriate to have the repetition frequency of such pulse train undergo as nearly stepless a linear increase of value as possible, to perfectly simulate the linear increase in the surface area of the exposure aperture during the course of the exposure; after all, this is a main purpose of such a light-dependent signal, i.e., in addition to its fundamental role of indicating the prevailing scene-light level. However, in order to avoid the need for implementation of a stepless linear modification of the repetition frequency, and in order to likewise avoid the need for implementation of a stepwise repetition-frequency increase involving a large number of frequency increments closely simulating a stepless linear increase, the present invention bypasses any attempt to make the increase of the repetition frequency per se follow closely the linear increase in the area of the exposure aperture.

Instead, a minimal number of repetition-frequency increments, and indeed increments having somewhat unexpected values, is employed, such that only the totalized-light signal relied on by the system closely approximate to its nominal or ideal course with respect to time, irrespective of what this might mean for the accuracy of the light-dependent signal per se.

Specifically, if the parabola 10 represents the exposure-light time integral S resulting from linear opening-up of the exposure aperture, then nominally the value (the repetition frequency) of the light-dependent signal (the pulse train) should rise in exact correspondence thereto. In the embodiment here illustrated a mere three different values of the frequency-division factor established by the frequency-divider stage 3 of FIG. 1 suffices, unexpectedly well, for yielding a piecewise-linearized totalized-light signal closely approximating to the parabolic exposure-light time integral S, i.e., the curve 10, to be simulated.

The piecewise linearization of the totalized-light signal comprises three line segments 14, 15 and 16. Line segment 14 extends from time t2 to time t3. Line segment 15 extends from time t1 to time t2. Line segment 16 extends from t=0 to time t1.

The last line segment 14 will be discussed first. Beyond point A3 on exposure-light time-integral curve 10, i.e., occurring at time t3, the exposure aperture stays at maximum size, and therefore the time-integral curve 10, from point A3 and time t3 on, converts to straight-line form, as indicated at 13. In order that, past the time t3 of reaching the maximum aperture size, an increment of the repetition frequency of the light-dependent pulse train not be needed, the last line segment 14 of the three-line-segment piecewise linearization has a slope identical to that of the straight-line segment 13 of the time-integral curve 10, and is continuous with straight-line segment 13. Accordingly, the terminal line segment 14 of the piecewise linearization 14, 15, 16 is merely a downwards or backwards continuation of the straight-line segment 13 into which the time-integral curve S anyway converts subsequent to reaching maximum aperture size at time t3.

How far back or down the straight-line terminal segment 13 of the light-integral curve 10 can be continued, i.e., to constitute the third line segment 14 of the piecewise linearization, is determined by the tolerance range of the system. In FIG. 2, below the parabolic time-integral curve 10 there is indicated a lower tolerance-limit parabolic curve 11, and above curve 10 an upper tolerance-limit parabolic curve 12, these two tolerance-limit parabolic curves 11, 12 together defining a tolerance range within which the piecewise-linearized totalized-light signal generated by the system is to be confined.

The amount of the permissible percentage error (measured along the vertical axis) implied by this tolerance range will depend upon what level of exposure accuracy is to be imparted to the system, for example in turn depending upon the precision of operation of other components utilized, such as the light-dependent pulse generator 1, 2 itself, the shutter-diaphragm system of the camera and so forth. Typically, however, the ordinate values of the points on the lower tolerance-limit parabola 11 are certainly not to be lower than 75% of the ordinate values of the points on the exposure-light time-integral curve 10, and preferably not lower than about 90% of the curve-10 ordinate values. Likewise, the ordinate values of the points on the upper tolerance-limit parabola 12 are certainly not to be in excess of 125% of the ordinate values of the points on the exposure-light time-integral curve 10, and preferably not in excess of about 110% of the curve-10 ordinate values. The narrower of these two tolerance ranges, i.e., from about 90% to about 110% of the ordinate-values of curve 10, is illustrated here, but still narrower tolerance ranges would also be appropriate, in the context of particularly high-accuracy systems.

Now, returning to the question how far down or back the terminal straight-line section of time-integral curve 10 can be continued, i.e., to constitute the terminal line segment 14 of the piecewise linearization 14, 15, 16, it is to be noted in FIG. 2 that this line segment 13, 14 extends downwards and backwards until it intersects the lower tolerance-limit parabola 11 at point A2. This intersection corresponds to exposure time t2, and accordingly t2 represents the time of the last decrement of the frequency-division factor introduced by frequency-divider stage 3 during the ongoing course of an exposure.

Attention is next directed to line segment 15, extending from point A2 back and down to point A1, and constituting the next-to-last line segment of the three-line-segment piecewise linearization 14, 15, 16 of the parabolic exposure-light time integral S, i.e., of curve 10. At its upper end, this middle line segment 15 coincides with the lower tolerance-limit parabola 11 at point A2. Its slope is so established that it extend as far back and down as possible, without leaving the parabolic tolerance-limit range 11, 12. In the illustrative instance, the slope of line segment 15 is so chosen that it intersect the upper tolerance-limit parabola 12 tangent thereto at point B, and then extend further back and down and terminate where it once more intersects the lower tolerance-limit parabola 11, i.e., at point A1. The intersection at point A1 corresponds to exposure time t1. Accordingly, moment t1 represents the moment at which the next-to-last one of the three frequency-division decrements is implemented by frequency-divider stage 3, during the ongoing course of the exposure.

In the illustrative instance, although the tolerance range 11, 12 is a fairly narrow one, it will be seen that this single line segment 15 nevertheless spans an unexpectedly large fraction of the total operating range of the system.

Figure 3:
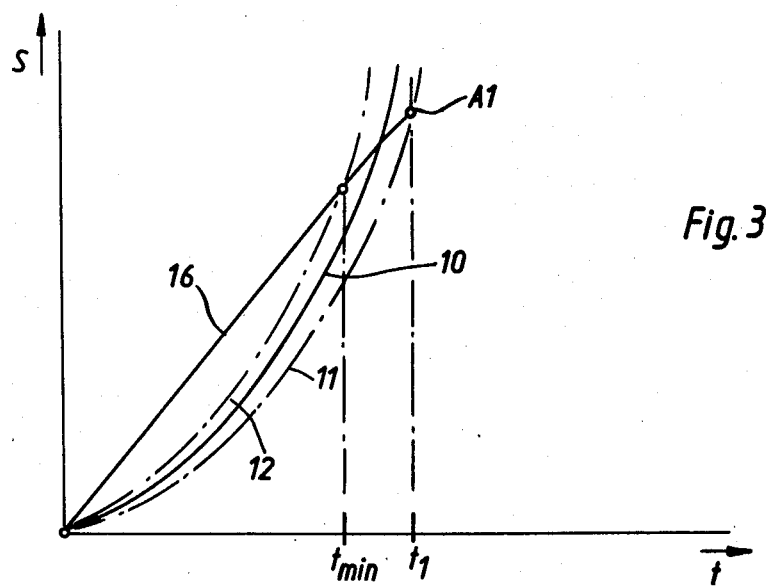
FIG. 3 is an enlarged depiction of the part of FIG. 2 located near the origin.

Attention is finally directed to line segment 16, which constitutes the first line segment of the three-line-segment piecewise linearization 14, 15, 16 of the exposure-light time integral curve 10. FIG. 3 is an expanded-scale depiction of this portion of FIG. 2, and reference should be had to it.

It has already been explained that, in accordance with the present invention, it is not the value (repetition frequency) of the light-dependent signal (the pulse train) which is to closely simulate the instantaneous value of the linearly increasing exposure aperture, and that instead, with seeming lack of concern for the amount of the percentage error of the latter, it is the totalized-light signal (the count on counter 4) which is to be made as close as possible to the time integral of the amount of exposure light passing through the exposure aperture of the shutter-diaphragm. However, even taking this approach, problems arise in the piecewise linearization of the exposure-light time integral curve 10 in the region of the origin.

In particular, the upper end of this line segment 16 is to be at point A1, as already explained, and the question arises how to piecewise linearize backwards to the origin, i.e., if at all. Continued piecewise linearization back to the origin, confined within the tolerance-limit range 11, 12 would, as should be evident from FIG. 3, require at least two line segments, and therefore two further frequency-division factors. It will be clear that it is a main object of the invention to minimize the number of stepwise repetition-frequency increments to be implemented. Accordingly, if one line segment could be used instead of two, that would clearly be of advantage, if it did not detract from system accuracy. In accordance with the invention, it is noted that, in this part of the system's operating range, one is in the vicinity of $t_{min}$, the shortest exposure duration which the given shutter-diaphragm system can implement. Inasmuch as exposure durations shorter than $t_{min}$ cannot be implemented by definition, it might, quite wrongly, appear that the slope(s) of any piecewise-linearization line segment(s) located between $t=0$ and $t_{min}$ are irrelevant. However, this is not actually so. Excessive percentage error in the ongoing value of the totalized-light signal generated during the course of an exposure prior to time $t_{min}$ are, indeed, irrelevant, in so far as the possibility of exposure termination witin this time interval might be considered, i.e., because exposure termination cannot be realized within this time interval. On the other hand, it must be understood that, upon reaching time $t_{min}$, the value of the totalized-light signal made available to the system must, from that moment on, be accurate, for the clear reason that, starting at time $t_{min}$, exposure termination under the control of the totalized-light signal begins to become a possibility.

In the illustrative instance, line segment 16, whose upper end is already set at point A1, is given a slope such that, as it extends back and down towards the origin, it has, at time $t_{min}$, a value just within the tolerance range 11, 12. In this way it becomes possible to span the range from $t=0$ to $t_{min}$ using a single line segment 16. The percentage error of the totalized-light signal within the range $t=0$ to $t_{min}$ is extremely high; as can be seen from FIG. 3, in the middle of that range, the percentage error is on the order of 100%, i.e., line segment 16 having at such points ordinate values about twice those of the points on time-integral curve 10. However, when time $t_{min}$ is reached and exposure termination becomes possible, the ordinate value of line segment 16 is already within, and in the illustrative instance just within, the acceptable tolerance range 11, 12 centered about the ideal value of time-integral curve 10. Accordingly, as soon as exposure termination becomes possible, the previously very inaccurate totalized-light signal just begins to have a value which is accurate, within the limits of the tolerance range.

Now, returning to FIG. 2, and the inventive piecewise linearization of the exposure-light time integral curve 10 having now been explained, consideration can be given to the frequency-division factors dictated by this piecewise linearization. As already indicated, a mere three such frequency-division factors are sufficient, corresponding to the three line segments of the linearization. The first such frequency-division factor has a value inversely proportional to the slope of line segment 16, extending from the origin to point A1. The second frequency-division factor has a value inversely proportional to the slope of line segment 15, extending from point A1 to point A2. The last of the three frequency-division factors has a value inversely proportional to the slope of line segment 14, 13, extending from point A2 through point A3 and on upwards. The first frequency-division factor is such that, during the time interval from $t=0$ to $t_{min}$, very great errors are permitted to arise in the value of the totalized-light signal, although without any effect upon system accuracy. The third frequency-division factor is such that no change of frequency-division factor becomes necessary as the shutter-diaphragm system converts from its increasing-aperture state to its maximum-aperture state at time $t_3$.

Indeed, it is to be noted that, of as much interest as the number of frequency-division factors, is the number of changes of the frequency-division factor. For the entire range of operation of the system, only two changes of frequency-division factor need actually occur, the first occurring at time $t_1$, and the second occurring at time $t_2$. In principle, therefore, the frequency-divider stage 3 of FIG. 1 need only be capable of implementing two different frequency-division factors. In particular, the first frequency-division factor implemented by frequency-divider stage 3 has a value such as to result in the first line segment 16; the second such as to result in the second line segment 17. Then, if the undivided repetition frequency of the pulse train generated by light-dependent pulse generator 2 is properly selected, no third frequency-division factor need be implemented by frequency-divider stage 3; instead, stage 3 can simply be deactivated so as not to divide this repetition frequency, if the undivided repetition frequency has a value inversely proportional to the slope of third line segment 14, 13. However, in practice, it will often be preferable to employ a further frequency-division factor for this last line segment 14, 13, for example if the undivided repetition frequency of the light-dependent pulse generator 1, 2 to be used happens not to be of an appropriate value, and special design or adjustment of the undivided repetition frequency is not warranted economically or not feasibly to be performed.

It will be understood that the amount of the tolerance range is susceptible to a certain amount of variation, i.e., in accordance with ordinary photographic considerations concerning the extent to which a somewhat over- or underexposed film image is conventionally to be considered acceptably over- or underexposed. In general, if the tolerance range is made very narrow, the use of one or more further such line segments for the piecewise linearization of the exposure-light time integral might become necessary.

In the illustrative example explained above, it has been assumed that the exposure aperture of the shutter-diaphragm increases in surface area linearly, as a straight-line function of time, during the opening-up phase of the exposure. However, it will be appreciated that the problems and solutions discussed above apply with equal weight, when not even more so, to other progressive opening-up schedules for the exposure aperture, the problem being, in each such case, to take into account the ongoing increase of the exposure-aperture area by means of discrete repetition frequency increments, and a minimum number of such increments.

All this having been said, one or two words are in order concerning circuit implementation of the circuit schematically indicated in FIG. 1. The timer 8 which triggers the successive decreases of frequency-division factor can be synchronized, as by the schematically illustrated switch 9, with the start of the opening of the shutter-diaphragm's exposure aperture, but thereafter be unsynchronized and free-running, if the operation with respect to time of both the shutter diaphragm and the timer are sufficiently predetermined and reliable. Thus, the timer 8 can start to operate in actual response to physical increase of the exposure aperture size or, for example, in response to movement of a mechanical component or the generation of an electrical signal merely commanding or initiating the start of the aperture size increase or the start of the exposure. Alternatively, the timer 8 could be positively synchronized with the shutter-diaphragm, such that each decrement of frequency-division factor occur in actual response to the exposure aperture reaching a predetermined size. Likewise, if the shutter diaphragm is controlled by a control mechanism, e.g., a stepper motor, then the operation of the control mechanism, e.g., the control signals which drive the stepper motor, could be used to synchronize the timer 8 and implement proper timing of the successive frequency-division factor decrements.

Persons skilled in the art will understand that resort to successive frequency-division factor decrements is but one alternative. Instead, it would be possible to use a frequency-multiplier stage capable of implementing successive increments of a frequency-multiplication factor. For example, each pulse from light-dependent pulse generator 2, could trigger a pulse generator operative for generating, in response thereto, a predetermined number of successive pulses, typically of much higher repetition frequency, which would then be the pulses actually counted by light-totalizing counter 4. In that event, the stepwise increase of the repetition frequency would be implemented by means of a stepwise increase in the number of pulses generated in response to each pulse from pulse generator 1, 2.

It will be understood that each of the elements described above, or two or more together, may also find a useful application in other types of circuit configurations and operations differing from the types described above.

While the invention has been illustrated and described as embodied in the combination of a digital light totalizer cooperating with a shutter-diaphragm whose exposure aperture increases as a straight-line function of elapsed time, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In combination with a photographic-camera shutter-diaphragm system of the type operative for effecting a progressive change of exposure-aperture size during the ongoing course of an exposure and including means for terminating the exposure at least in dependence upon generation of a terminate-exposure signal but incapable of implementing an exposure of duration shorter than a predetermined time interval $t_{min}$, a light-totalizing system which comprises: light-dependent pulse-generating means, including photosensitive means exposed to scene light, operative for producing a pulse train whose pulse repetition frequency varies with variations in the level of scene light to which the photosensitive means is exposed; light-totalizing digital counter means operative for issuing the terminate-exposure signal upon the reaching of a predetermined count; and frequency-converting means receiving pulses from the pulse-generating means and transmitting pulses to the counter means, and including means operative, during the ongoing progressive change of exposure-aperture size, for modifying the repetition frequency of the pulse train applied to the counter means in a limited number of discrete successive steps, the number of stepwise repetition-frequency changes performed and the amount of each frequency change being such that, if the scene-light level to which the photosensitive means is exposed remains constant during the progressive change of exposure-aperture size, a plot of the repetition frequency of the pulse train applied to the counter means versus elapsed exposure time would be proportional to a piecewise linearization of the time integral curve of the exposure-aperture size consisting of successive straight-line segments which, at least above $t_{min}$, are all confined within a predetermined error-of-total-exposure tolerance range centered about the time integral curve.

2. The combination defined in claim 1, the shutter-diaphragm system being of the type which effects a straight-line increase of exposure-aperture size during the ongoing course of the exposure leading to maximum exposure-aperture size with the exposure, after the time of reaching maximum exposure-aperture size, being performed with the exposure-aperture size constant at such maximum value, and with the time integral curve of the exposure-aperture size accordingly being a quadratic function until the time of reaching the maximum exposure-aperture size and from that point on a simple straight-line function, the stepwise repetition-frequency changes performed being successive repetition-frequency increases and their number and respective amounts being such that a plot of the repetition frequency of the pulse train applied to the counter means versus elapsed exposure time would be proportional to a piecewise linearization of the quadratic and then straight-line time integral curve of the exposure-aperture size at least above $t_{min}$.

3. The combination defined in claim 2, the terminal one of the stepwise repetition-frequency changes performed during the straight-line increase of exposure-aperture size being such that the corresponding terminal straight-line segment of the piecewise linearization has a slope identical to and is furthermore continuous with the terminal straight-line part of the time integral curve itself.

4. The combination defined in claim 1, the shutter-diaphragm system being of the type which effects a progressive change of exposure-aperture size during the ongoing course of the exposure leading to a predetermined final exposure-aperture size with the exposure, after the time of reaching the predetermined exposure-aperture size, being performed with the exposure-aperture size constant at such predetermined value, and with the time integral of the exposure-aperture size accordingly being a non-linear function until the time of reaching the predetermined exposure-aperture size and from that point on a simple straight-line function, the terminal one of the stepwise repetition-frequency changes performed during the progressive change of exposure-aperture size being such that the corresponding terminal straight-line segment of the piecewise linearization has a slope identical to and is furthermore continuous with the straight-line part of the time integral curve itself.

5. The combination defined in claim 1, the successive repetition-frequency changes being such that one of the straight-line segments of the piecewise linearization has two ends points respectively located at one of the lower and upper limits of the predetermined error-of-total exposure tolerance range and, intermediate the two end points, one further point located at the other of the lower and upper limits of the predetermined error-of-total-exposure tolerance range.

6. The combination defined in claim 2, the successive repetition-frequency changes being such that one of the straight-line segments of the piecewise linearization has two end points both located at the lower limit of the predetermined error-of-total exposure tolerance range and, intermediate the two end points, one further point located at the upper limit of the predetermined error-of-total-exposure tolerance range.

7. The combination defined in claim 3, the successive repetition-frequency changes being such that the one of the straight-line segments of the piecewise linearization immediately previous to the terminal straight-line segment has two end points both located at the lower limit of the predetermined error-of-total-exposure tolerance range and, intermediate the two ends points, one further point located at the upper limit of the predetermined error-of-total-exposure tolerance range.

8. The combination defined in claim 4, the successive repetition-frequency changes being such that the one of the straight-line segments of the piecewise linearization immediately previous to the terminal straight-line segment has two end points both located at one of the lower and upper limits of the predetermined error-of-total-exposure tolerance range and, intermediate the two end points, one further point located at the other of the lower and upper limits of the predetermined error-of-total-exposure tolerance range.

9. The combination defined in claim 1, the successive repetition-frequency changes being such that the initial one of the straight-line segments of the piecewise linearization is confined within the predetermined error-of-total-exposure tolerance range above $t_{min}$ but below $t_{min}$ is located outside the predetermined error-of-total-exposure tolerance range.

10. The combination defined in claim 9, the seccessive repetition-frequency changes being such that the initial one of the straight-line segments of the piecewise linearization enters the predetermined error-of-total-exposure tolerance range at $t_{min}$.

* * * * *